(12) United States Patent
Dong

(10) Patent No.: US 12,408,183 B2
(45) Date of Patent: Sep. 2, 2025

(54) BUFFERED GROUPCAST DOWNLINK DATA NOTIFICATION METHOD, AND TERMINAL AND ACCESS POINT DEVICE

(71) Applicant: BEIJING XIAOMI MOBILE SOFTWARE CO., LTD., Beijing (CN)

(72) Inventor: Xiandong Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 422 days.

(21) Appl. No.: 17/919,169

(22) PCT Filed: Apr. 17, 2020

(86) PCT No.: PCT/CN2020/085430
§ 371 (c)(1),
(2) Date: Oct. 14, 2022

(87) PCT Pub. No.: WO2021/208098
PCT Pub. Date: Oct. 21, 2021

(65) Prior Publication Data
US 2023/0164806 A1    May 25, 2023

(51) Int. Cl.
*H04W 72/30* (2023.01)
*H04W 84/12* (2009.01)

(52) U.S. Cl.
CPC ............ *H04W 72/30* (2023.01); *H04W 84/12* (2013.01)

(58) Field of Classification Search
CPC ..... H04W 72/30; H04W 84/12; H04W 28/16; H04W 74/006; H04W 72/04; H04W 52/0216; H04W 68/025; H04W 74/04; H04L 12/12
See application file for complete search history.

(56) References Cited

U.S. PATENT DOCUMENTS

| 2008/0151814 A1* | 6/2008 | Jokela ............... H04W 74/04 370/328 |
| 2011/0096709 A1 | 4/2011 | Jeyaseelan |
| 2015/0163646 A1* | 6/2015 | Zhao .................. H04L 12/185 370/312 |
| 2015/0341758 A1 | 11/2015 | Aggarwal et al. |

(Continued)

FOREIGN PATENT DOCUMENTS

| CN | 103634126 A | 3/2014 |
| CN | 104022842 A | 9/2014 |

(Continued)

OTHER PUBLICATIONS

Indian Patent Application No. 202247063990 Office Action dated Jan. 5, 2023, 6 pages.

(Continued)

*Primary Examiner* — Mewale A Ambaye
(74) *Attorney, Agent, or Firm* — Cozen O'Connor

(57) ABSTRACT

A buffered groupcast downlink data notification method, a terminal and an access point device are disclosed. The method includes: generating, by an access point device, a message carrying information on buffered groupcast downlink data, in which the information on the buffered groupcast downlink data is configured to indicate whether groupcast downlink data of each link of at least two links is buffered in an access point; and sending, by the access point device, the message.

20 Claims, 5 Drawing Sheets

(56) References Cited

U.S. PATENT DOCUMENTS

| | | | |
|---|---|---|---|
| 2018/0139600 A1* | 5/2018 | Kim | H04W 52/0216 |
| 2018/0205800 A1* | 7/2018 | Park | H04W 4/00 |
| 2020/0221545 A1* | 7/2020 | Stacey | H04W 84/12 |
| 2021/0058936 A1* | 2/2021 | Gordaychik | H04W 72/0453 |
| 2021/0235486 A1* | 7/2021 | Atefi | H04W 74/002 |

FOREIGN PATENT DOCUMENTS

| | | |
|---|---|---|
| EP | 1903720 A1 | 3/2008 |
| JP | 2010206245 A | 9/2010 |

OTHER PUBLICATIONS

European Patent Application No. 20931048.1, Search and Opinion dated Mar. 3, 2023, 9 pages.
PCT/CN2020/085430 International Search Report dated Jan. 21, 2021; 2 pages.
European Patent Application No. 20931048.1 Search Report dated Feb. 7, 2025, 7 pages.

* cited by examiner

BUFFERED GROUPCAST DOWNLINK DATA NOTIFICATION METHOD, AND TERMINAL AND ACCESS POINT DEVICE

CROSS-REFERENCE TO RELATED APPLICATION

This application is a U.S. national phase application of International Application No. PCT/CN2020/085430, filed on Apr. 17, 2020, the content of which is hereby incorporated by reference in its entirety.

TECHNICAL FIELD

The disclosure relates to a field of communication technologies, and particularly to a buffered groupcast downlink data notification method, a buffered groupcast downlink data notification apparatus, a terminal and an access point device.

BACKGROUND

In a new wireless fidelity (Wi-Fi) standard, an aggregation of multiple frequency bands may be implemented between a station and an access point. The aggregation of multiple frequency bands refers to transmitting data simultaneously under multiple frequency bands (2.4 GHz, 5 GHz and 6-7 GHZ) or transmitting data in multiple bandwidths of one frequency band, so as to improve a transmission efficiency.

SUMMARY

Embodiments of the disclosure provide a buffered groupcast downlink data notification method, a buffered groupcast downlink data notification apparatus, a terminal and an access point device.

According to an aspect of embodiments of the disclosure, a buffered groupcast downlink data notification method is provided. The method includes generating, by an access point device, a message carrying information on buffered groupcast downlink data, in which the information on the buffered groupcast downlink data is configured to indicate whether groupcast downlink data of each link of at least two links is buffered in an access point; and sending, by the access point device, the message.

According to another aspect of the embodiments of the disclosure, a buffered groupcast downlink data notification method is provided. The method includes receiving, by a terminal, a message carrying information on buffered groupcast downlink data, in which the information on the buffered groupcast downlink data is configured to indicate whether groupcast downlink data of each link of at least two links is buffered in an access point; and determining, by the terminal based on the message, whether the groupcast downlink data to be acquired is buffered in the access point for the at least two links.

According to another aspect of the embodiments of the disclosure, a terminal is provided. The terminal includes a processor and a memory configured to store instructions executable by the processor. The processor is configured to load and execute the instructions to perform the buffered groupcast downlink data notification method described above.

According to another aspect of the embodiments of the disclosure, an access point device is provided. The access point device includes a processor and a memory configured to store instructions executable by the processor. The processor is configured to load and execute the instructions to perform the buffered groupcast downlink data notification method described above.

According to another aspect of the embodiments of the disclosure, a non-transitory computer-readable storage medium is provided. When instructions in the non-transitory computer-readable storage medium are executed by a processor, the processor is caused to perform the buffered groupcast downlink data notification method described above.

It is to be understood that both the foregoing general description and the following detailed description are exemplary and explanatory only, and are not restrictive of the present disclosure, as claimed.

BRIEF DESCRIPTION OF THE DRAWINGS

The accompanying drawings, which are incorporated in and constitute a part of this specification, illustrate embodiments consistent with the disclosure, and serve to explain the principles of the disclosure together with the specification.

DETAILED DESCRIPTION

The example embodiments will be described in detail here, and examples thereof are shown in the accompanying drawings. When the following descriptions refer to the accompanying drawings, unless otherwise indicated, the same numbers in different drawings represent the same or similar elements. The implementations described in the following example embodiments do not represent all the implementations consistent with the present invention. Rather, they are merely examples of the apparatus and method consistent with some aspects of the present invention as detailed in the appended claims.

Figure 1:
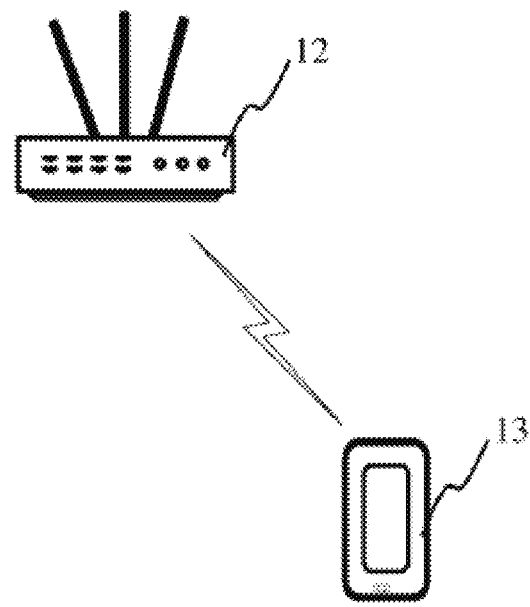
FIG. 1 is a schematic diagram illustrating a communication system according to an embodiment.

FIG. 1 is a schematic diagram illustrating a communication system according to an embodiment. As illustrated in FIG. 1, the mobile communication system may include an access point device 12 (Access point for short, i.e., AP) and a terminal 13 (also called as station (STA)).

The terminal 13 may include various kinds of handheld devices, vehicle mounted devices, wearable devices, computing devices with the wireless communication function or other processing devices connected to wireless modulators, and various forms of user devices, mobile stations (MSs), terminals and the like. For ease of description, the devices mentioned above are collectively called terminals.

The access point device 12 mentioned in the disclosure may be an access point of the Wi-Fi network, for example, a wireless router, a gateway or the like. The terminal 13 is connected to the access point device 12 in a wireless way, to implement a wireless transmission.

Multiple links may be simultaneously established between the terminal 13 and the access point device 12 under multiple frequency bands (such as 2.4 GHz, 5 GHz and 6-7 GHZ), to implement multi-link aggregation (MLA), so that the rate and throughout of the Wi-Fi network may be multiplied and the Wi-Fi network may be applied in scenarios such as video transmission, augmented reality (AR), virtual reality (VR) and so on.

In the Wi-Fi standard of the related art, the terminal 13 may acquire buffered downlink data from the access point device 12 in the following ways: competitive acquisition (listening a beacon frame), or AP polling (non-contention period) acquisition, in which the buffered groupcast downlink data is acquired by listening a beacon frame. For example, the access point device 12 indicates whether the buffered groupcast downlink data exists to the terminal by carrying a bitmap structure in the beacon frame. The format of the beacon frame is shown in Table 1.

TABLE 1

| Element ID | Length | DTIM Count | DTIM Period | Bitmap Control | Partial Virtual Bitmap |
|---|---|---|---|---|---|

Element ID is an identification code of an element (with a length of 1 byte), configured to identify different fields contained in the beacon frame.

Length refers to a length (with a length of 1 byte), describing a length of the element.

DTIM count and DTIM period represent the DTIM count and interval time (each of which has a length of 1 byte). In the 802.11 protocol, traffic indication map (TIM) is a basic structure of the traffic indication map. A standard TIM merely indicates unicast downlink data buffered in the AP. DTIM is a special TIM, which may indicate groupcast downlink data buffered in the AP in addition to the buffered unicast information. Generally, each beacon frame includes one TIM, and it is determined whether the TIM is DTIM based on the two parameters: DTIM count and DTIM Period. DTIM Period may indicate how many TIMs take place before one DTIM occurs. When DTIM count=0, it indicates that the current TIM is DTIM.

Bitmap control is a bitmap control field (with a length of 1 byte), having a length of 8 bits. The 0-th bit is configured to indicate whether the groupcast downlink data is buffered. For example, if the bit is 1, it indicates that there is groupcast downlink data buffered, otherwise, there is no groupcast downlink data buffered. The $1^{st}$ to 7-th bits are configured to identify Bitmap Offset, which is configured to indicate an offset situation of an association identifier (AID), i.e., indicating the AID of the terminal corresponding to the first piece of buffered unicast downlink data.

Partial Virtual Bitmap is a partial virtual bitmap field (with a length within a range of 1 byte to 251 bytes), each bit of which is configured to indicate whether one AID has the groupcast downlink data buffered.

In the access point device, an AID table is stored. Each AID is bound with a MAC address of its corresponding terminal. A range of AID is 0-2007, such that one AP may be associated with 2007 nodes at most in the protocol. A position corresponding to AID=0 is a reserved field.

If the access point device does not support multi-basic service set identifier (Multi-BSSID), i.e., the access point device can be configured with only one BSSID, AID is assigned to the terminal starting from AID=1.

If the access point device supports Multi-BSSID, i.e., the access point device can be configured with more than one BSSID, the AID is assigned to the secondary BSSID (non-transmitted BSSID) starting from AID=1. For example, if the number of secondary BSSIDs is k, AID=1~k are assigned to the secondary BSSIDs, to indicate whether each secondary BSSID has the groupcast downlink data buffered. AID=k+1~2n−1 are reserved and set to be 0, to pad bits occupied by the secondary BSSIDs. It should be note that whether a main BSSID (transmitted BSSID) has the groupcast downlink data buffered is indicated by the 0-th bit of Bitmap control.

The related standard supports performing communication simultaneously under multiple links. According to an operation method in the related standard, if the access point device needs to notify the buffered groupcast downlink data, the beacon frame is broadcasted under each link, and the beacon frame broadcasted under each link merely indicates whether the groupcast downlink data of the BSSID corresponding to the link is buffered, which may cause increased signaling and unnecessary waste of resources.

The communication system and business scenarios described in the embodiments of the present disclosure are used to better explain the technical solutions of the present disclosure, but not constructed to limit the technical solutions of the present disclosure. It would be appreciated by those skilled in the art that with the evolution of the communication system and the emergence of new business scenarios, the technical solutions of the present disclosure may also be suitable to similar technical problems.

Figure 2:
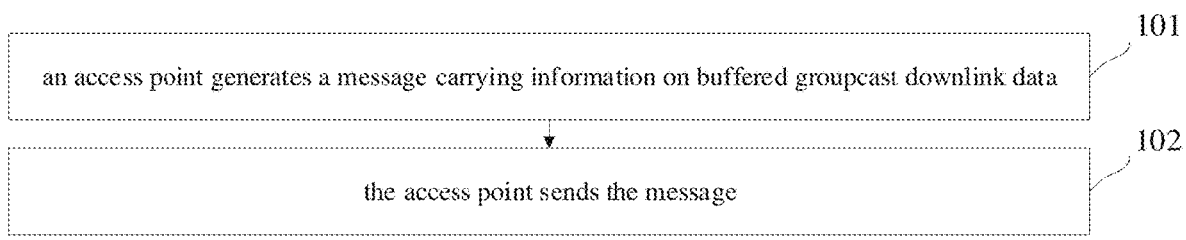
FIG. 2 is a flowchart illustrating a buffered groupcast downlink data notification method performed by an access point, according to an embodiment.

FIG. 2 is a flowchart illustrating a buffered groupcast downlink data notification method according to an embodiment. As illustrated in FIG. 2, the method includes the followings.

In block 101, an access point generates a message carrying information on buffered groupcast downlink data.

Here, the information on the buffered groupcast downlink data is configured to indicate whether groupcast downlink data of each link of at least two links is buffered in the access point.

In block 102, the access point sends the message.

For example, the access point broadcasts the message under multiple links simultaneously, so that the same message may be used to notify whether the station has the buffered groupcast downlink data under each link.

In the embodiment of the disclosure, the access network device may indicate in the same message whether the groupcast downlink data of each link of the at least two links is buffered, so that the resource occupation problem caused by different links needing different messages to indicate in the related art may be avoided, thus saving signaling resources.

Optionally, the information on the buffered groupcast downlink data includes at least one of the followings: identifications of the at least two links; values configured to indicate whether the groupcast downlink data is buffered for the at least two links; and frequency bands of the at least two links.

In other words, in the embodiment of the disclosure, the information on the buffered groupcast downlink data may include one field, or may include two or three fields.

The information on the buffered groupcast downlink data may be classified into three kinds. The first kind carries an identification and/or frequency band of the link+value, and the value is used to indicate whether each link or frequency band has buffered data. The second kind merely carries an identification and/or frequency band of the link, if the information carries the identification and/or frequency band of the link, it indicates that there is buffered data, otherwise, there is no buffered data. The third kind merely carries a value, the frequency band or link corresponding to each value is defined in advance, the value is used to indicate whether there is buffered data.

A format of an example of the first kind of the information on the buffered groupcast downlink data is shown in Table 2.

TABLE 2

| Link1 | 1 | Link2 | 0 | ... | Linkn | 1 |
|---|---|---|---|---|---|---|

Link1~Linkn represent the identifications of links. Each identification corresponds to one specific Link. For example, Link1 may refer to a 20 MHz frequency band below the 2.4G frequency band. Link2 may refer to a 40 MHz frequency band below the 2.4G frequency band. Linkn may refer to a 40 MHz frequency band below the 5G frequency band. The identification of each link and the corresponding Link may be defined in the access point and the station by the protocol, or may be stored in the access point and sent by the access point to the station, for example sent to the station through a beacon frame.

In the Table 2, 1 indicates that the Link has the groupcast downlink data buffered, 0 indicates that the Link has no groupcast downlink data buffered. Of course, here, the value may be defined in other ways, which is not limited herein.

Optionally, the information on the buffered groupcast downlink data further includes the frequency band of the link.

A format of another example of the first kind of the information on the buffered groupcast downlink data is shown in Table 3.

TABLE 3

| Band1 | Link1 | 1 | Band2 | Link1 | 0 | ... | Bandn | Link1 | 1 |
|---|---|---|---|---|---|---|---|---|---|

Band1~Bandn represent the identifications of frequency bands. Each identification corresponds to one specific frequency band. For example, Band1 may refer to the 2.4G frequency band. Band2 may refer to the 5G frequency band, and so on. The identification of each frequency band and the corresponding Band may be defined in the access point and the station by the protocol, or may be stored in the access point and sent by the access point to the station, for example sent to the station through a beacon frame.

After defining the frequency band of the link, in a correspondence between the identification of the link and the Link, only a frequency range corresponding to the Link needs to be defined without defining the frequency band. For example, if Link1 refers to the 20 MHz frequency band, Band1 and Link1 correspond to the 20 MHz frequency band below the 2.4G frequency band, Band2 and Link1 correspond to the 20 MHz frequency band below the 5G frequency band, and so on.

The formats of the first kind, the second kind and the third kind of the information on the buffered groupcast downlink data will be described below in detail.

Optionally, sending the message includes sending a beacon frame, in which the beacon frame includes a link set field, and the link set field includes the information on the buffered groupcast downlink data.

In the embodiment of the disclosure, the beacon frame is still used to carry the information on the buffered groupcast downlink data, only one Link set field needs to be added in the beacon frame.

The format of the beacon frame is shown in Table 4.

TABLE 4

| Element ID | Length | DTIM Count | DTIM Period | Bitmap Control | Link set | Partial Virtual Bitmap |
|---|---|---|---|---|---|---|

The format of the Link set field is shown in Table 2 or Table 3, which is not repeated herein. The length of the Link set field is variable, which may be changed according to an actual number of links.

Optionally, the access point does not support multi-basic service set identifier (Multi-BSSID), and generating the message carrying the information on the buffered groupcast downlink data includes in response to the groupcast downlink data being buffered in the access point, performing at least one of the followings: configuring a 0-th bit of a bitmap control field of the beacon frame to be a predetermined value; configuring a delivery traffic indication message (DTIM) count field to be a predetermined value; configuring a value corresponding to the link with the buffered groupcast downlink data in the link set field to be a predetermined value; carrying at least one of the identification and the frequency band of the link with or without the buffered groupcast downlink data in the link set field.

Here, for the first kind and the third kind of the information on the buffered groupcast downlink data, it is only required to configure the value corresponding to the link with the buffered groupcast downlink data to be a predetermined value. For the second kind of the information on the buffered groupcast downlink data, it is required to carry the identification and/or the frequency band of the link with or without the buffered groupcast downlink data in the link set field, so as to indicate whether the station has the groupcast downlink data buffered.

For example, when the access point does not support Multi-BSSID and the access point has the buffered groupcast downlink data, the 0-th bit of the bitmap control field of the beacon frame is configured to be a predetermined value, and the value corresponding to the link with the buffered groupcast downlink data in the link set field is configured to be a predetermined value.

When the access point does not support Multi-BSSID, only one BSSID exists, so that it is unnecessary to indicate a groupcast buffer situation of each BSSID in Partial Virtual Bitmap, but it is only required to indicate the groupcast buffer situation in the 0-th bit of Bitmap control.

For example, when the access point has buffered groupcast downlink data, the 0-th bit of Bitmap control is configured to be 1, and the value corresponding to each link in Link set is configured based on whether there is groupcast downlink data.

Optionally, the access point supports multi-basic service set identifier (Multi-BSSID), and generating the message carrying the information on the buffered groupcast downlink data includes in response to the groupcast downlink data being buffered in the access point, performing at least one of the followings: configuring a 0-th bit of a bitmap control field of the beacon frame to be a predetermined value; configuring a delivery traffic indication message (DTIM) count field to be a predetermined value; configuring a bit configured to indicate the BSSID corresponding to the link with the buffered groupcast downlink data in $1^{st}$ to k-th bits of a partial virtual bitmap (PVB) field of the beacon frame to be a predetermined value, where k is a number of secondary BSSIDs; configuring a value corresponding to the link with the buffered groupcast downlink data in the link set field to be a predetermined value; carrying at least one of the identification and the frequency band of the link with or without the buffered groupcast downlink data in the link set field.

For example, when the access point supports Multi-BSSID and the access point has the groupcast downlink data buffered, the 0-th bit of the bitmap control field of the beacon frame is configured to be a predetermined value, the bit corresponding to the BSSID with the buffered groupcast downlink data in $1^{st}$ to k-th bits of the PVB field of the beacon frame is configured to be a predetermined value, and the value corresponding to the link with buffered groupcast downlink data in the link set field is configured to a predetermined value, where k represents the number of secondary BSSIDs.

When the access point supports Multi-BSSID, multiple BSSIDs exist simultaneously, it is required to indicate the groupcast buffer situation of each BSSID in Partial Virtual Bitmap.

For example, the access point has the groupcast downlink data buffered, the 0-th bit of Bitmap control is configured to be 1, which indicates that there is the groupcast downlink data buffered. The $1^{st}$ to k-th bits of Partial Virtual Bitmap indicate whether each secondary BSSID has the groupcast downlink data buffered respectively, and the value corresponding to each link in Link set is configured based on whether there is the groupcast downlink data.

Optionally, sending the message includes broadcasting the message merely through a link with an established initial association (or called as initial connection), in which the link with the established initial association is a link with the established initial association between a station and the access point.

The access point may broadcast the above-mentioned beacon frame simultaneously under multiple links. If there is no initial connection established between the station and the access point under one link, the access point does not broadcast the beacon frame carrying the information on the buffered groupcast downlink data under the link, for example, merely broadcasting a common beacon frame (without carrying TIM).

The access point may determine whether each link has an initial association established between the station and the access point based on the links under which the AID is assigned to the station. For example, the AID is assigned to the station under one link, it is determined that the link has an initial association established between the station and the access point, otherwise, the link has no initial association established between the station and the access point.

The station may establish the link with the access point through any link. However, the access point assigns the AID to the station only when establishing the initial association. Although the beacon frame may carry the buffer situation of the groupcast downlink data of multiple links, there may be a situation where the groupcast downlink data of multiple links belongs to the same station, in this case, in order to avoid repeatedly sending the beacon frame to the same station, the beacon frame is sent to the station only on the link having the initial association established with the station. In this way, a frequency of sending the beacon frame may be decreased and the signaling overhead is small, so that frequently sending and listening may be avoided, thus facilitating saving power of the access point and the station.

It should be noted that the above steps in blocks 101-102 may be combined arbitrarily with the above optional steps.

Figure 3:
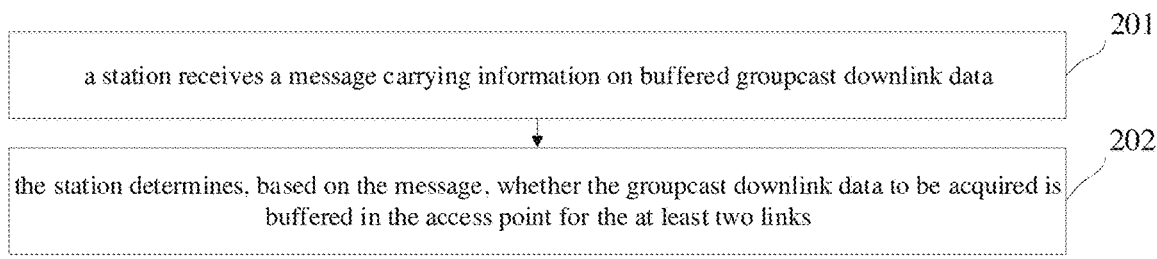
FIG. 3 is a flowchart illustrating a buffered groupcast downlink data notification method performed by a terminal, according to an embodiment.

FIG. 3 is a flowchart illustrating a buffered groupcast downlink data notification method according to an embodiment of the disclosure. As illustrated in FIG. 3, the method includes the followings.

In block 201, a station receives a message carrying information on buffered groupcast downlink data.

Here, the information on the buffered groupcast downlink data is configured to indicate whether groupcast downlink data of each link of at least two links is buffered in the access point.

In block 202, the station determines, based on the message, whether the groupcast downlink data to be acquired is buffered in the access point for the at least two links.

The station acquires the buffered groupcast downlink data from the access point after determining that the access point has the buffered groupcast downlink data to be acquired by itself.

In the embodiment of the disclosure, the access network device may indicate in the same message whether the groupcast downlink data of each link of the at least two links is buffered, such that the resource occupation problem caused by different links needing different messages to indicate in the related art may be avoided, thus saving signaling resources.

Optionally, the information on the buffered groupcast downlink data includes at least one of the followings: identifications of the at least two links; values configured to indicate whether the groupcast downlink data is buffered for the at least two links; and frequency bands of the at least two links.

Optionally, receiving the message carrying the information on the buffered groupcast downlink data includes receiving a beacon frame, in which the beacon frame includes a link set field, and the link set field includes the information on the buffered groupcast downlink data.

It should be noted that the above steps in blocks 201-202 may be combined arbitrarily with the above optional steps.

Figure 4:
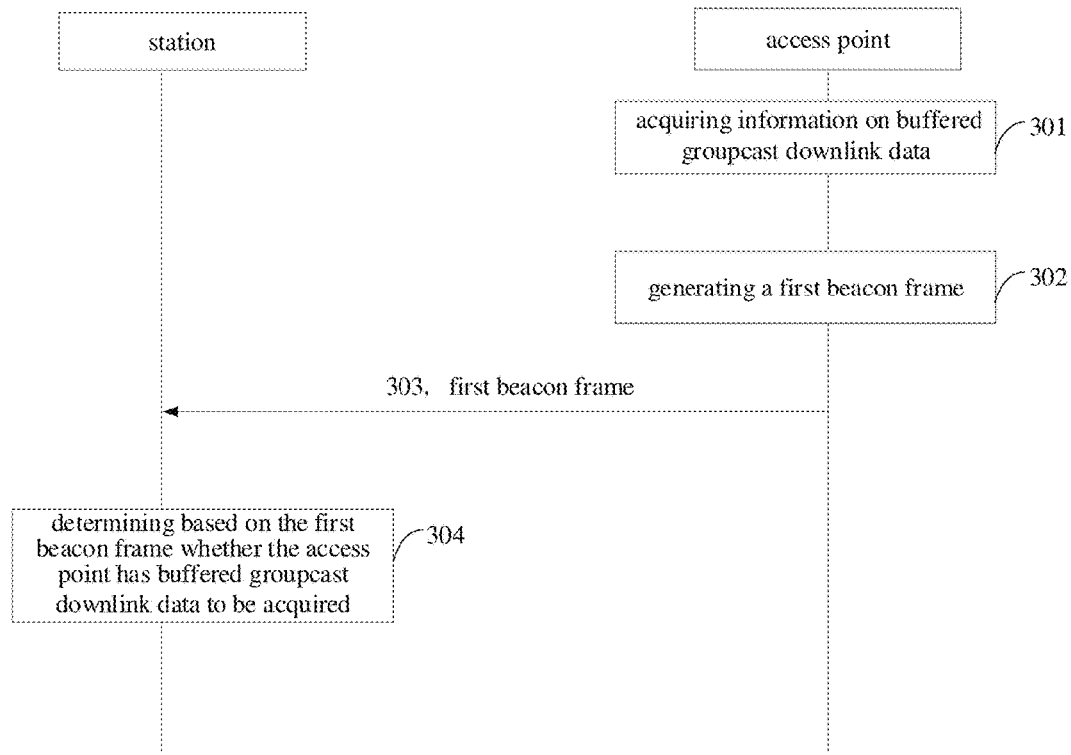
FIG. 4 is a flowchart illustrating a buffered groupcast downlink data notification method using a beacon frame, according to an embodiment.

FIG. 4 is a flowchart illustrating a buffered groupcast downlink data notification method according to an embodiment of the disclosure. As illustrated in FIG. 4, the method includes the followings.

In block 301, an access point acquires information on buffered groupcast downlink data.

In other words, the access point determines groupcast downlink data of which BSSIDs and groupcast downlink data of which links is buffered based on its own buffered groupcast downlink data.

In block 302, the access point generates a first beacon frame.

The information on the buffered groupcast downlink data in the first beacon frame is a first kind of the information on the buffered groupcast downlink data. The composition of the information on the buffered groupcast downlink data includes the following cases.

In the first case, the information on the buffered groupcast downlink data includes an identification of the link and a value indicating whether there is buffered groupcast downlink data for the link. In the first case, the identification of each link corresponding to a certain link under a certain frequency band. For example, Link1 may refer to a 20 MHz frequency band below the 2.4G frequency band. Link2 may refer to a 40 MHz frequency band below the 2.4G frequency band. Linkn may refer to a 40 MHz frequency band below the 5G frequency band, and so on. With regard to the format of the information on the buffered groupcast downlink data corresponding to the first case, reference can be made to Table 2.

In a second case, the information on the buffered groupcast downlink data includes a frequency band of the link and a value indicating whether there is buffered groupcast downlink data for the link. In the second case, since only the frequency band and the corresponding value are indicated, it indicates that in this case, each link under one frequency band has the same situation of whether there is the groupcast downlink data buffered.

A format of an example of the first kind of the information on the buffered groupcast downlink data is shown in Table 5.

TABLE 5

| Band1 | 1 | Band2 | 0 | ... | Band n | 1 |
|---|---|---|---|---|---|---|

Band1~Band n represent the frequency bands of the links. For example, Band1 may refer to the 2.4G frequency band. Bandn may refer to the 5G frequency band. It should be noted that, if two links under one frequency band have different situations of whether there is the groupcast downlink data buffered, the information on the buffered groupcast downlink data in the second case cannot be used, but the information on the buffered groupcast downlink data defined in the first case and the third case can be used.

In a third case, the information on the buffered groupcast downlink data includes a frequency band of the link, an identification of the link and a value indicating whether there is buffered groupcast downlink data for the link. Compared to the first case, in the third case, the frequency band of the link is defined. In a correspondence between the identification of the link and the Link, only a frequency range corresponding to the Link needs to be defined without defining the frequency band. For example, if Link1 refers to the 20 MHz frequency band, Band1 and Link1 correspond to the 20 MHz frequency band below the 2.4G frequency band, Band2 and Link1 correspond to the 20 MHz frequency band below the 5G frequency band, and so on. With regard to the format of the information on the buffered groupcast downlink data corresponding to the third case, reference can be made to Table 3.

When the access point does not support Multi-BSSID, it is unnecessary for the first beacon frame to indicate a groupcast buffer situation of each BSSID in Partial Virtual Bitmap. That is, the $1^{st}$-k-th bits of Partial Virtual Bitmap of the first beacon frame are not assigned to the secondary BSSIDs.

When the access point has buffered groupcast downlink data, DTIM count is configured to be 0, the 0-th bit of the bitmap control field is configured to be a predetermined value (such as 1), and the value corresponding to the link with the buffered groupcast downlink data in the link set field is configured to be a predetermined value.

When the access point does not have the buffered groupcast downlink data, the 0-th bit of the bitmap control field of the beacon frame is configured to a non-predetermined value (such as 0), the value corresponding to each link in the link set field is configured to a non-predetermined value.

When the access point supports Multi-BSSID, the first beacon frame needs to indicate a groupcast buffer situation of each BSSID in Partial Virtual Bitmap. That is, the $1^{st}$-k-th bits of Partial Virtual Bitmap of the first beacon frame are assigned to the secondary BSSIDs.

When the access point has buffered groupcast downlink data, DTIM count is configured to be 0, the 0-th bit of the bitmap control field of the beacon frame is configured to be a predetermined value (such as 1), the bit corresponding to the BSSID with the buffered groupcast downlink data in $1^{st}$ to k-th bits of the PVB field of the beacon frame is configured to be a predetermined value, and the value corresponding to the link with buffered groupcast downlink data in the link set field is configured to a predetermined value, where k represents the number of secondary BSSIDs.

When the access point does not have the buffered groupcast downlink data, the 0-th bit of the bitmap control field of the beacon frame is configured to a non-predetermined value (such as 0), each of the $1^{st}$-k-th bits of the PVB field of the beacon frame is configured to a non-predetermined value, the value corresponding to each link in the link set field is configured to a non-predetermined value.

In block 303, the access point sends the first beacon frame, and the station receives the first beacon frame.

In block 304, the station determines based on the first beacon frame whether the access point has buffered groupcast downlink data to be acquired.

The station acquires the buffered groupcast downlink data from the access point after determining that the access point has the buffered groupcast downlink data to be acquired by itself.

Figure 5:
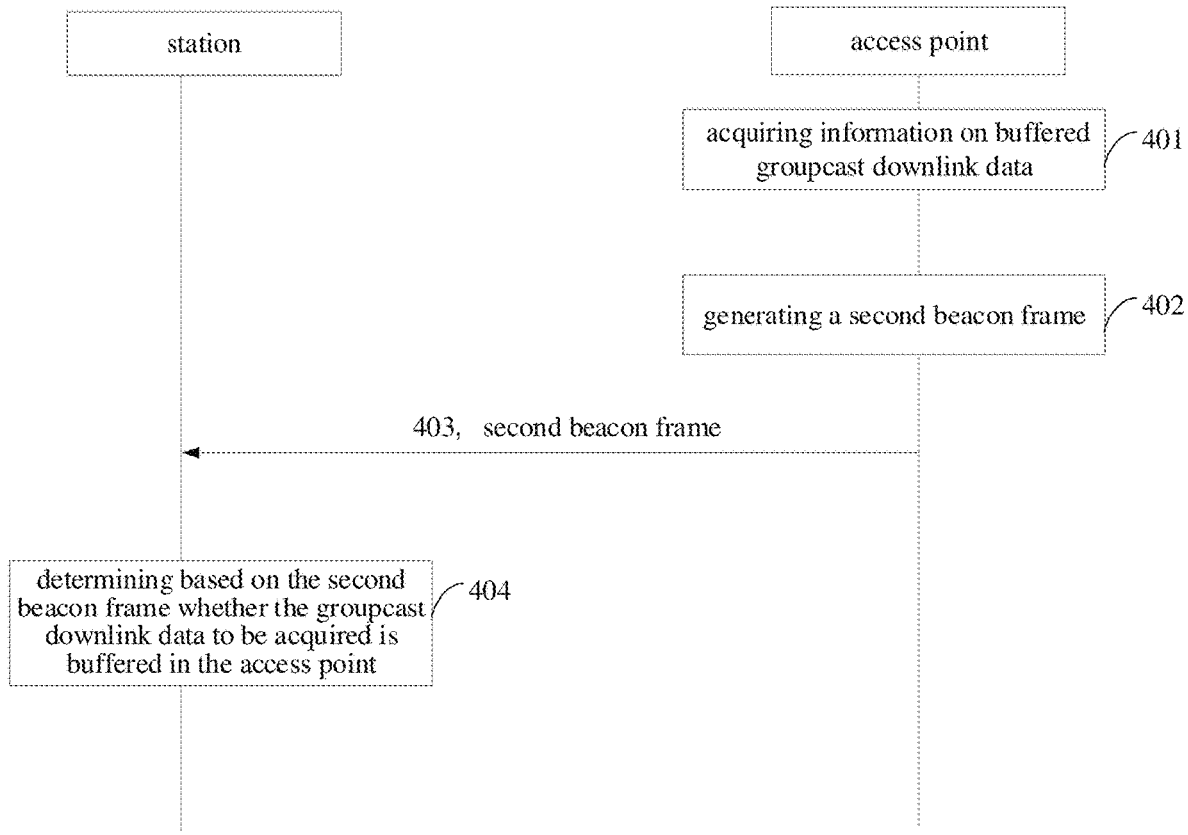
FIG. 5 is a flowchart illustrating a buffered groupcast downlink data notification method using a beacon frame, according to an embodiment.

FIG. 5 is a flowchart illustrating a buffered groupcast downlink data notification method according to an embodiment of the disclosure. As illustrated in FIG. 5, the method includes the followings.

In block 401, an access point acquires information on buffered groupcast downlink data.

In other words, the access point determines groupcast downlink data of which BSSIDs and groupcast downlink data of which links is buffered based on its own buffered groupcast downlink data.

In block 402, the access point generates a second beacon frame.

The information on the buffered groupcast downlink data in the second beacon frame is a second kind of the information on the buffered groupcast downlink data. The composition of the information on the buffered groupcast downlink data includes the following cases.

In the first case, the information on the buffered groupcast downlink data includes an identification of the link. The identification of each link indicates that the link has buffered groupcast downlink data or the link has no buffered groupcast downlink data. The identification of the link in the information on the buffered groupcast downlink data indicates there is the buffered data or there is no buffered data, which may be defined in the access point and the station by the protocol, or may be stored in the access point and sent by the access point to the station, for example sent to the station through a beacon frame.

A format of an example of the second kind of the information on the buffered groupcast downlink data is shown in Table 6.

TABLE 6

| Link1 | Link3 | ... | Linkn − 1 |

Link1, Link3~Linkn−1 represent the identifications of links. The identification of each link in the table indicates that the groupcast downlink data of the link is buffered.

In a second case, the information on the buffered groupcast downlink data includes a frequency band of the link. The frequency band of each link indicates that all links under the frequency band have buffered groupcast downlink data or do not have buffered groupcast downlink data.

A format of another example of the second kind of the information on the buffered groupcast downlink data is shown in Table 7.

TABLE 7

| Band1 | Band5 | ... | Band n |

Band1, Band5~Bandn represent the frequency bands of links. For example, the frequency band of each link in the table indicates that the groupcast downlink data of all links under the frequency band is buffered.

In a third case, the information on the buffered groupcast downlink data includes an identification and a frequency band of the link. The frequency band+the identification of each link indicates that the link under the frequency band has buffered groupcast downlink data or does not have buffered groupcast downlink data.

A format of another example of the second kind of the information on the buffered groupcast downlink data is shown in Table 8.

TABLE 8

| Band1 | Link1 | Band5 | Link3 | Bandn | Linkn − 1 |

Band1, Band5~Bandn represent the frequency bands of links. Link1, Link3~Linkn−1 represent the identifications of the links. For example, the frequency band+the identification of the link in the table indicates that the groupcast downlink data of the link is buffered.

In the beacon frame, each of the DTIM count field, the 0-th bit of the bitmap control field, and the $1^{st}$ to k-th bits of the partial virtual bitmap field has the same configuration way as that mentioned in block 302.

In the link set field, the identification of the link with or without the buffered groupcast downlink data is carried, or the frequency band of the link with or without the buffered groupcast downlink data is carried, or the identification and the frequency band of the link with or without the buffered groupcast downlink data are carried.

In block 403, the access point sends the second beacon frame, and the station receives the second beacon frame.

In block 404, the station determines based on the second beacon frame whether the groupcast downlink data to be acquired is buffered in the access point.

The station acquires the buffered groupcast downlink data from the access point after determining that the access point has the buffered groupcast downlink data to be acquired by itself.

Figure 6:
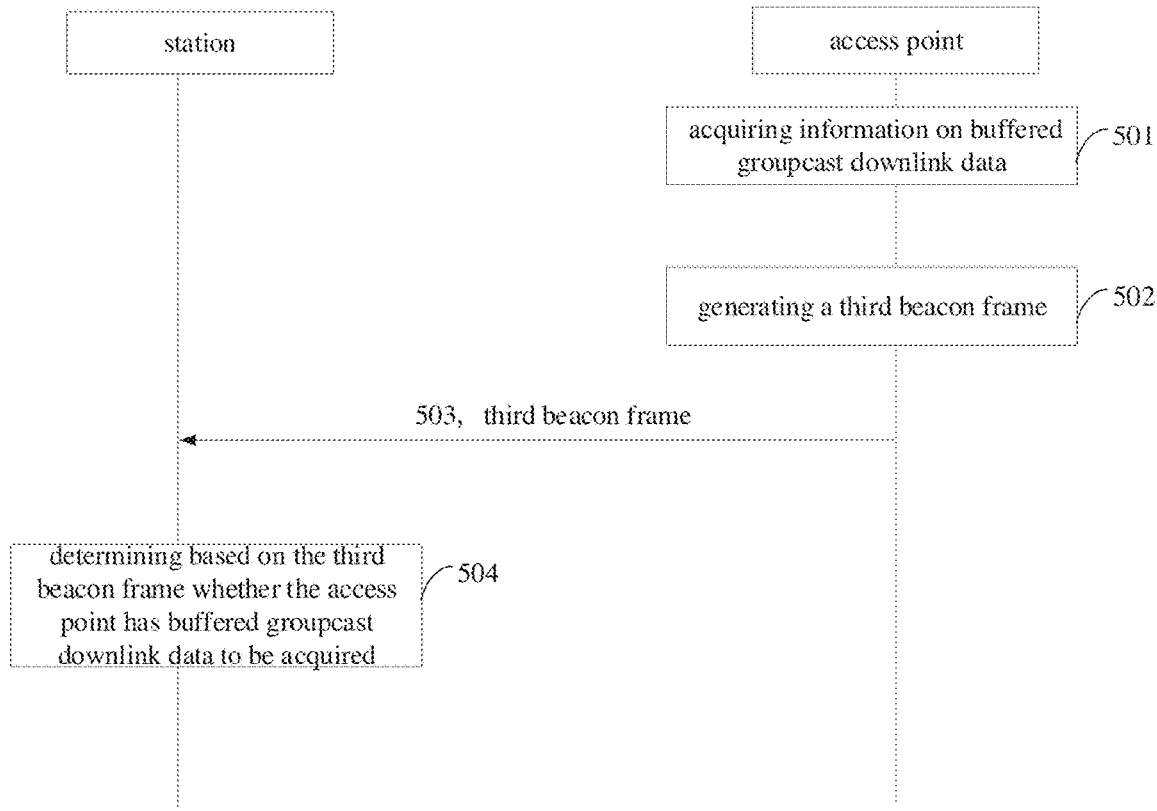
FIG. 6 is a flowchart illustrating a buffered groupcast downlink data notification method using a beacon frame, according to an embodiment.

FIG. 6 is a flowchart illustrating a buffered groupcast downlink data notification method according to an embodiment of the disclosure. As illustrated in FIG. 6, the method includes the followings.

In block 501, an access point acquires information on buffered groupcast downlink data.

In other words, the access point determines groupcast downlink data of which BSSIDs and groupcast downlink data of which links is buffered based on its own buffered groupcast downlink data.

In block 502, the access point generates a third beacon frame.

The information on the buffered groupcast downlink data in the third beacon frame is a third kind of the information on the buffered groupcast downlink data.

The information on the buffered groupcast downlink data includes a value configured to indicate whether there is buffered groupcast downlink data for a link. In the embodiment of the disclosure, the link or frequency band corresponding to each value in the information on the buffered groupcast downlink data is defined in advance. For example, a mapping table exists, to map each value to one link or frequency band. The mapping table may be defined in the access point and the station by the protocol, or may be stored in the access point and sent by the access point to the station, for example sent to the station through a beacon frame.

A format of an example of the third kind of the information on the buffered groupcast downlink data is shown in Table 9.

TABLE 9

| 1 | 0 | ... | 1 |

For example, each value in the above table may be respectively mapped to Link1~Linkn in order. When the value is 1, it indicates that the groupcast downlink data of the link is buffered, when the value is 0, it indicates that the groupcast downlink data of the link is not buffered.

In the beacon frame, each of the DTIM count field, the 0-th bit of the bitmap control field, and the $1^{st}$ to k-th bits of the partial virtual bitmap field has the same configuration way as that mentioned in block 302. The link set field has the same configuration way as that mentioned in block 302.

In block 503, the access point sends the third beacon frame, and the station receives the third beacon frame.

In block 504, the station determines based on the third beacon frame whether the groupcast downlink data to be acquired is buffered in the access point.

The station acquires the buffered groupcast downlink data from the access point after determining that the access point has the buffered groupcast downlink data to be acquired by the station.

Figure 7:
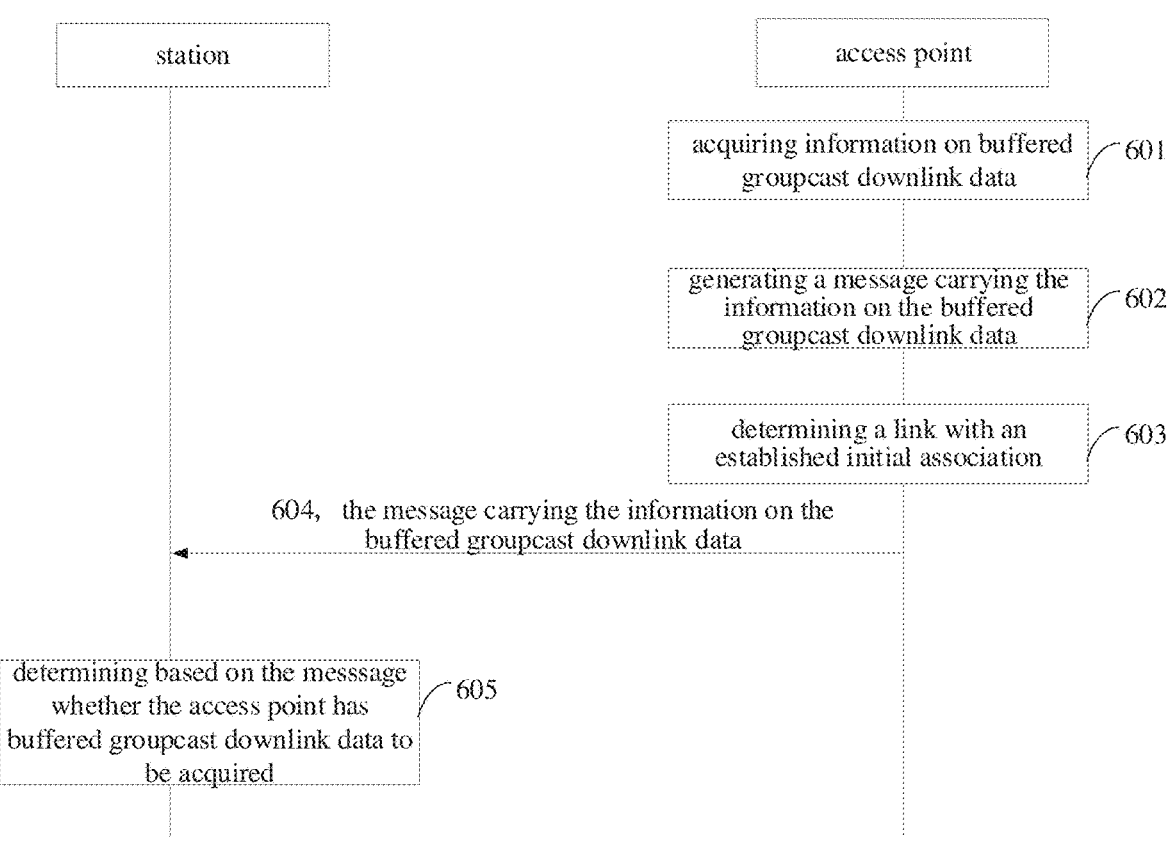
FIG. 7 is a flowchart illustrating a buffered groupcast downlink data notification method according to an embodiment.

FIG. 7 is a flowchart illustrating a buffered groupcast downlink data notification method according to an embodiment of the disclosure. As illustrated in FIG. 7, the method includes the followings.

In block 601, an access point acquires information on buffered groupcast downlink data.

In other words, the access point determines groupcast downlink data of which BSSIDs and groupcast downlink data of which links is buffered based on its own buffered groupcast downlink data.

In block 602, the access point generates a message carrying the information on the buffered groupcast downlink data.

The message may be the above mentioned beacon frame, and with regard to the generation way of the message, reference can be made to blocks 302, 402 and 502.

In block 603, the access point determines a link with an established initial association.

In block 604, the access point broadcasts the message through the link with the established initial association. The station receives the message carrying the information on the buffered groupcast downlink data.

The access point may simultaneously broadcast the above mentioned beacon frame under multiple links. If a link has no initial connection established between the station and the access point, the access point does not broadcast the beacon frame carrying the information on the buffered groupcast downlink data under the link, for example, only broadcasting a common beacon frame (without carrying TIM).

The access point may determine whether each link has an initial association established between the station and the access point based on the links under which the AID is assigned to the station. For example, the AID is assigned to the station under one link, it is determined that the link has an initial association established between the station and the access point, otherwise, the link has no initial association established between the station and the access point.

The station may establish the link with the access point through any connection. However, the access point assigns the AID to the station only when establishing the initial association. Although the beacon frame may carry the buffer situation of the groupcast downlink data of multiple links, there may be a situation where the groupcast downlink data of multiple links belongs to the same station, in this case, in order to avoid repeatedly sending the beacon frame to the same station, the beacon frame is sent to the station only on the link having the initial association established with the station. In this way, a frequency of sending the beacon frame may be decreased and the signaling overhead is small, so that frequently sending and listening may be avoided, thus facilitating saving power of the access point and the station.

In block 605, the station determines based on the message whether the groupcast downlink data to be acquired is buffered in the access point.

The station acquires the buffered groupcast downlink data from the access point after determining that the access point has the buffered groupcast downlink data to be acquired by the station itself.

Figure 8:
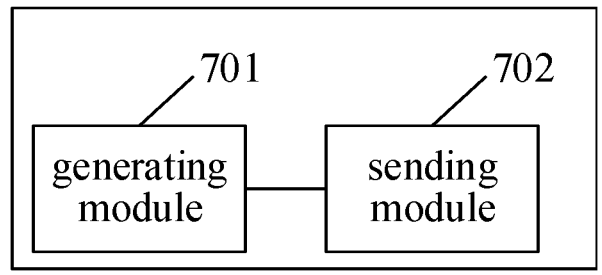
FIG. 8 is a block diagram illustrating a buffered groupcast downlink data notification access point apparatus according to an embodiment.

FIG. 8 is a block diagram illustrating a buffered groupcast downlink data notification apparatus according to an embodiment of the disclosure. The apparatus has functions of the access point device which implements the above method embodiments. The functions may be implemented by the hardware, or by executing the corresponding software with the hardware. As illustrated in FIG. 8, the apparatus includes a generating module 701 and a sending module 702.

The generating module 701 is configured to generate a message carrying information on buffered groupcast downlink data, in which the information on the buffered groupcast downlink data is configured to indicate whether groupcast downlink data of each link of at least two links is buffered in an access point.

The sending module 702 is configured to send the message.

Optionally, the information on the buffered groupcast downlink data includes at least one of the followings: identifications of the at least two links; values configured to indicate whether the groupcast downlink data is buffered for the at least two links; frequency bands of the at least two links.

Optionally, the sending module 702 is configured to send a beacon frame, in which the beacon frame includes a link set field, and the link set field includes the information on the buffered groupcast downlink data.

Optionally, the access point does not support multi-basic service set identifier (Multi-BSSID), and the generating module 701 is configured to perform at least one of the followings in response to the groupcast downlink data being buffered in the access point: configuring a 0-th bit of a bitmap control field of the beacon frame to be a predetermined value; configuring a delivery traffic indication message (DTIM) count field to be a predetermined value; configuring a value corresponding to a link with the buffered groupcast downlink data in the link set field to be a predetermined value; carrying at least one of an identification and a frequency band of a link with or without the buffered groupcast downlink data in the link set field.

Optionally, the access point supports multi-basic service set identifier (Multi-BSSID), and the generating module 701 is configured to perform at least one of the followings in response to the groupcast downlink data being buffered in the access point: configuring a 0-th bit of a bitmap control field of the beacon frame to be a predetermined value; configuring a delivery traffic indication message (DTIM) count field to be a predetermined value; configuring a bit configured to indicate a BSSID corresponding to a link with the buffered groupcast downlink data in $1^{st}$ to k-th bits of a partial virtual bitmap (PVB) field of the beacon frame to be a predetermined value, where k is a number of secondary BSSIDs; configuring a value corresponding to the link with the buffered groupcast downlink data in the link set field to be a predetermined value; carrying at least one of an identification and a frequency band of a link with or without the buffered groupcast downlink data in the link set field.

Optionally, the sending module 702 is configured to broadcast the message merely through a link with an established initial association, in which the link with the established initial association is a link with the established initial association between a station and the access point.

Figure 9:
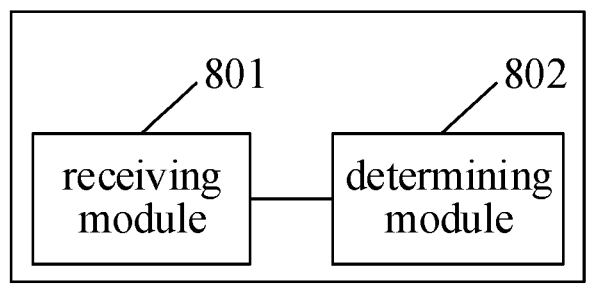
FIG. 9 is a block diagram illustrating a buffered groupcast downlink data notification terminal apparatus according to an embodiment.

FIG. 9 is a block diagram illustrating a buffered groupcast downlink data notification apparatus according to an embodiment of the disclosure. The apparatus has functions of the terminal which implements the above method embodiments. The functions may be implemented by the hardware, or by executing the corresponding software with the hardware. As illustrated in FIG. 9, the apparatus includes a receiving module 801 and a determining module 802.

The receiving module 801 is configured to receive a message carrying information on buffered groupcast downlink data, in which the information on the buffered groupcast downlink data is configured to indicate whether groupcast downlink data of each link of at least two links is buffered in an access point.

The determining module 802 is configured to determine, based on the message, whether the groupcast downlink data to be acquired is buffered in the access point for the at least two links.

Optionally, the information on the buffered groupcast downlink data includes at least one of the followings: identifications of the at least two links; values configured to indicate whether the groupcast downlink data is buffered for the at least two links; frequency bands of the at least two links.

Optionally, the receiving module 801 is configured to receive a beacon frame, in which the beacon frame includes a link set field, and the link set field includes the information on the buffered groupcast downlink data.

Figure 10:
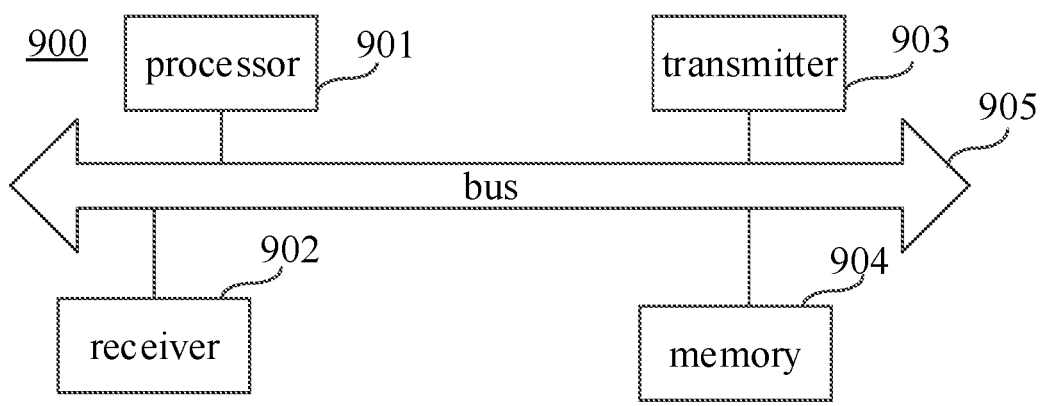
FIG. 10 is a block diagram illustrating a terminal according to an embodiment.

FIG. 10 is a block diagram illustrating a terminal 900 according to an embodiment. The terminal 900 may include a processor 901, a receiver 902, a transmitter 903, a memory 904 and a bus 905.

The processor 901 includes one or more processing cores. The processor 901 performs various functional applications and information processing by running software programs and modules.

The receiver 902 and the transmitter 903 may be implemented as a communication component, which may be a communication chip.

The memory 904 is connected to the processor 901 via the bus 905.

The memory 904 may be configured to store at least one instruction. The processor 901 is configured to execute the at least one instruction to perform each step in the above method embodiments.

In addition, the memory 904 can be implemented by any type of volatile or non-volatile storage device or a combination thereof. The volatile or non-volatile storage device includes, but is not limited to: magnetic disks or optical disks, electrically erasable and programmable Read-only memory (EEPROM), erasable programmable read-only memory (EPROM), static anytime access memory (SRAM), read-only memory (ROM), magnetic memory, flash memory, programmable read-only memory (PROM).

In an embodiment of the present disclosure, there is provided a non-transitory computer-readable storage medium. The storage medium has at least one instruction, at least one program, and at least one set of codes or set of instructions stored therein. The at least one instruction, the at least one program, and the at least one set of codes or set of instructions are loaded and executed by a processor to implement the buffered groupcast downlink data notification method described above.

Figure 11:
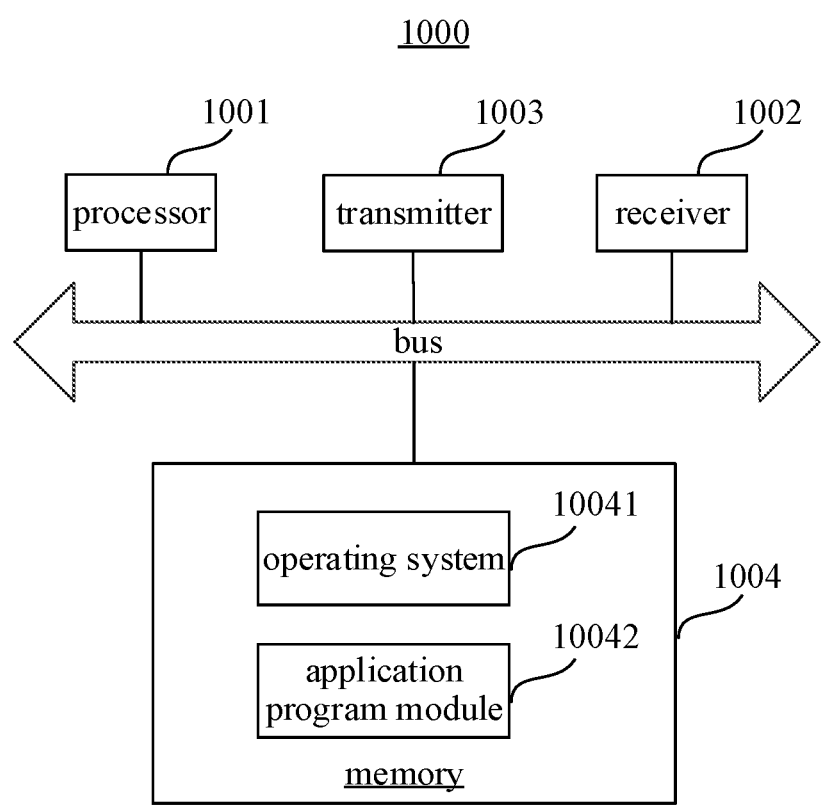
FIG. 11 is a block diagram illustrating an access point device according to an embodiment.

FIG. 11 is a block diagram illustrating an access pint device 1000 according to an embodiment. The access pint device 1000 may include a processor 1001, a receiver 1002, a transmitter 1003 and a memory 1004. The receiver 1002, the transmitter 1003 and the memory 1004 are coupled to the processor 1001 respectively via a bus.

The processor 1001 includes one or more processing cores. The processor 1001 performs the buffered groupcast downlink data notification method in the embodiments of the present disclosure which is performed by the access point device by running software programs and modules. The memory 1004 may be configured to store the software programs and modules. In detail, the memory 1004 may store an operating system 10041, at least one functional application program module 10042. The receiver 1002 is configured to receive communication data sent by another device. The transmitter 1003 is configured to send communication data to another device.

In an embodiment of the present disclosure, there is provided a non-transitory computer-readable storage medium. The storage medium has at least one instruction, at least one program, and at least one set of codes or set of instructions stored therein. The at least one instruction, the at least one program, and the at least one set of codes or set of instructions are loaded and executed by a processor to implement the buffered groupcast downlink data notification method described above.

An embodiment of the present disclosure further provides a buffered groupcast downlink data notification system. The buffered groupcast downlink data notification system includes a terminal and an access point device. The terminal may be the terminal provided by the embodiment described with reference to FIG. 10. The access point device may be an access point device provided by the embodiment described with reference to FIG. 11.

Other implementations of the present disclosure will readily occur to those skilled in the art upon consideration of the specification and practice of the invention disclosed herein. The disclosure is intended to cover any variations, uses, or adaptations of the disclosure that follow the general principles of the disclosure and include common general knowledge or techniques in the technical field not disclosed by the disclosure. The specification and examples are to be regarded as exemplary only, the true scope and spirit of the disclosure being indicated by the following claims.

It should be understood that the disclosure is not limited to the precise structure described above and shown in the drawings, and various modifications and changes may be made without departing from its scope. The scope of the present disclosure is only limited by the appended claims.

What is claimed is:

1. A buffered groupcast multicast downlink data notification method, comprising:
   generating, by an access point device, a message carrying information on buffered groupcast downlink data, wherein the information on the buffered groupcast downlink data is configured to indicate whether groupcast downlink data of each link of at least two links is buffered in an access point, wherein the information on the buffered groupcast downlink data comprises a value configured to indicate whether the groupcast downlink data is buffered for each of the at least two links; and
   sending, by the access point device, the message.

2. The method of claim 1, wherein the information on the buffered groupcast downlink data further comprises at least one of the followings:
   identifications of the at least two links;
   or
   frequency bands of the at least two links.

3. The method of claim 1, wherein sending the message comprises:
   sending a beacon frame, wherein the beacon frame comprises a link set field, and the link set field comprises the information on the buffered groupcast downlink data.

4. The method of claim 3, wherein the access point does not support multi-basic service set identifier (Multi-BSSID), and generating the message carrying the information on the buffered groupcast downlink data comprises:
   in response to the groupcast downlink data being buffered in the access point, performing at least one of the followings:
   configuring a 0-th bit of a bitmap control field of the beacon frame to be a first predetermined value;
   configuring a delivery traffic indication message (DTIM) count field to be a second predetermined value;
   configuring a value corresponding to a link with the buffered groupcast downlink data in the link set field to be a third predetermined value;
   carrying at least one of an identification and a frequency band of a link with or without the buffered groupcast downlink data in the link set field.

5. The method of claim 3, wherein the access point supports multi-basic service set identifier (Multi-BSSID), and generating the message carrying the information on the buffered groupcast downlink data comprises:
  in response to the groupcast downlink data being buffered in the access point, performing at least one of the followings:
  configuring a 0-th bit of a bitmap control field of the beacon frame to be a first predetermined value;
  configuring a delivery traffic indication message (DTIM) count field to be a second predetermined value;
  configuring a bit configured to indicate a BSSID corresponding to a link with the buffered groupcast downlink data in $1^{st}$ to k-th bits of a partial virtual bitmap (PVB) field of the beacon frame to be a predetermined value, where k is a number of secondary BSSIDs;
  configuring a value corresponding to the link with the buffered groupcast downlink data in the link set field to be a third predetermined value;
  carrying at least one of an identification and a frequency band of a link with or without the buffered groupcast downlink data in the link set field.

6. The method of claim 1, wherein sending the message comprises:
  broadcasting the message merely through a link with an established initial association, wherein the link with the established initial association is a link with the established initial association between a station and the access point.

7. A buffered groupcast downlink data notification method, comprising:
  receiving, by a terminal, a message carrying information on buffered groupcast downlink data, wherein the information on the buffered groupcast downlink data is configured to indicate whether groupcast downlink data of each link of at least two links is buffered in an access point, wherein the information on the buffered groupcast downlink data comprises a value configured to indicate whether the groupcast downlink data is buffered for each of the at least two links; and
  determining, by the terminal based on the message, whether the groupcast downlink data to be acquired is buffered in the access point for the at least two links.

8. The method of claim 7, wherein the information on the buffered groupcast downlink data further comprises at least one of the followings:
  identifications of the at least two links;
  or
  frequency bands of the at least two links.

9. The method of claim 7, wherein receiving the message carrying the information on the buffered groupcast downlink data comprises:
  receiving a beacon frame, wherein the beacon frame comprises a link set field, and the link set field comprises the information on the buffered groupcast downlink data.

10. An access point device, comprising:
  a processor;
  a memory configured to store instructions executable by the processor;
  wherein the processor is configured to load and execute the instructions to perform the followings:
  generating a message carrying information on buffered groupcast downlink data, wherein the information on the buffered groupcast downlink data is configured to indicate whether groupcast downlink data of each link of at least two links is buffered in an access point, wherein the information on the buffered groupcast downlink data comprises a value configured to indicate whether the groupcast downlink data is buffered for each of the at least two links; and
  sending the message.

11. A terminal, comprising:
  a processor;
  a memory configured to store instructions executable by the processor;
  wherein the processor is configured to load and execute the instructions to perform the buffered groupcast downlink data notification method of claim 7.

12. A non-transitory computer-readable storage medium, wherein when instructions stored in the computer-readable storage medium are executed by a processor, the buffered groupcast downlink data notification method of claim 1 is performed.

13. The method of claim 2, wherein sending the message comprises:
  sending a beacon frame, wherein the beacon frame comprises a link set field, and the link set field comprises the information on the buffered groupcast downlink data.

14. The method of claim 13, wherein the access point does not support multi-basic service set identifier (Multi-BSSID), and generating the message carrying the information on the buffered groupcast downlink data comprises:
  in response to the groupcast downlink data being buffered in the access point, performing at least one of the followings:
  configuring a 0-th bit of a bitmap control field of the beacon frame to be a first predetermined value;
  configuring a delivery traffic indication message (DTIM) count field to be a second predetermined value;
  configuring a value corresponding to a link with the buffered groupcast downlink data in the link set field to be a third predetermined value;
  carrying at least one of an identification and a frequency band of a link with or without the buffered groupcast downlink data in the link set field.

15. The method of claim 13, wherein the access point supports multi-basic service set identifier (Multi-BSSID), and generating the message carrying the information on the buffered groupcast downlink data comprises:
  in response to the groupcast downlink data being buffered in the access point, performing at least one of the followings:
  configuring a 0-th bit of a bitmap control field of the beacon frame to be a first predetermined value;
  configuring a delivery traffic indication message (DTIM) count field to be a second predetermined value;
  configuring a bit configured to indicate a BSSID corresponding to a link with the buffered groupcast downlink data in $1^{st}$ to k-th bits of a partial virtual bitmap (PVB) field of the beacon frame to be a predetermined value, where k is a number of secondary BSSIDs;
  configuring a value corresponding to the link with the buffered groupcast downlink data in the link set field to be a third predetermined value;
  carrying at least one of an identification and a frequency band of a link with or without the buffered groupcast downlink data in the link set field.

16. The access point device of claim 10, wherein the information on the buffered groupcast downlink data further comprises at least one of the followings:
  identifications of the at least two links;
  or
  frequency bands of the at least two links.

17. The access point device of claim 10, wherein sending the message comprises:

sending a beacon frame, wherein the beacon frame comprises a link set field, and the link set field comprises the information on the buffered groupcast downlink data.

18. The access point device of claim 17, wherein the access point does not support multi-basic service set identifier (Multi-BSSID), and generating the message carrying the information on the buffered groupcast downlink data comprises:

in response to the groupcast downlink data being buffered in the access point, performing at least one of the followings:

configuring a 0-th bit of a bitmap control field of the beacon frame to be a first predetermined value;

configuring a delivery traffic indication message (DTIM) count field to be a second predetermined value;

configuring a value corresponding to a link with the buffered groupcast downlink data in the link set field to be a third predetermined value;

carrying at least one of an identification and a frequency band of a link with or without the buffered groupcast downlink data in the link set field.

19. The access point device of claim 17, wherein the access point supports multi-basic service set identifier (Multi-BSSID), and generating the message carrying the information on the buffered groupcast downlink data comprises:

in response to the groupcast downlink data being buffered in the access point, performing at least one of the followings:

configuring a 0-th bit of a bitmap control field of the beacon frame to be a first predetermined value;

configuring a delivery traffic indication message (DTIM) count field to be a second predetermined value;

configuring a bit configured to indicate a BSSID corresponding to a link with the buffered groupcast downlink data in $1^{st}$ to k-th bits of a partial virtual bitmap (PVB) field of the beacon frame to be a predetermined value, where k is a number of secondary BSSIDs;

configuring a value corresponding to the link with the buffered groupcast downlink data in the link set field to be a third predetermined value;

carrying at least one of an identification and a frequency band of a link with or without the buffered groupcast downlink data in the link set field.

20. A non-transitory computer-readable storage medium, wherein when instructions stored in the computer-readable storage medium are executed by a processor, the buffered groupcast downlink data notification method of claim 7 is performed.

* * * * *